United States Patent
Beasley

[15] 3,683,789
[45] Aug. 15, 1972

[54] MEANS FOR INJECTING FLUID INTO MEAT PRODUCTS AND THE LIKE

[72] Inventor: Donald L. Beasley, Des Moines, Iowa

[73] Assignee: Townsend Engineering Company, Des Moines, Iowa

[22] Filed: July 20, 1970

[21] Appl. No.: 56,318

[52] U.S. Cl. ................................................99/256
[51] Int. Cl. ..............................................A23b 1/16
[58] Field of Search .........99/256, 255, 257; 17/42.1; 27/21–24; 128/215–216, 347

[56] References Cited

UNITED STATES PATENTS

| | | | |
|---|---|---|---|
| 2,602,391 | 7/1952 | Pedranti et al. | 99/256 X |
| 2,796,017 | 6/1957 | Schmidt | 99/256 |
| 2,984,170 | 5/1961 | Draudt et al. | 99/257 |

Primary Examiner—Walter A. Scheel
Assistant Examiner—Arthur O. Henderson
Attorney—Zarley, McKee & Thomte

[57] ABSTRACT

A means for injecting fluid into meat products and the like comprising a fluid manifold which is reciprocatably mounted adjacent a product support means. The fluid manifold is connected to a source of fluid under pressure and has a plurality of spaced apart bores formed therein. An injector needle is slidably mounted in each of the bores for piercing the meat product and to inject fluid therein as the manifold is moved towards the meat product. The relationship of the needles and the bores is such that the needle can slidably move inwardly into the bore and/or deflect in a lateral direction upon engaging a bone in the meat. Means is also provided on the needle for preventing the crystallization of salts on the inner end thereof. Further means is provided to prevent the bore of the needle from becoming clogged.

4 Claims, 6 Drawing Figures

PATENTED AUG 15 1972 3,683,789
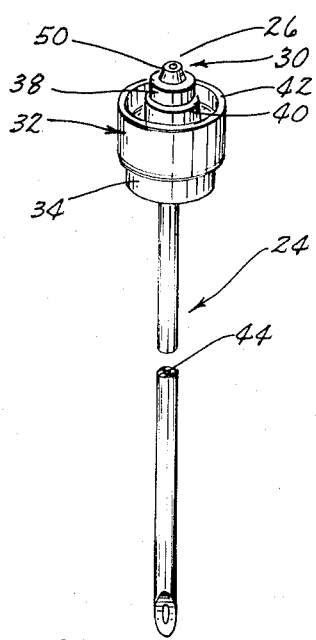
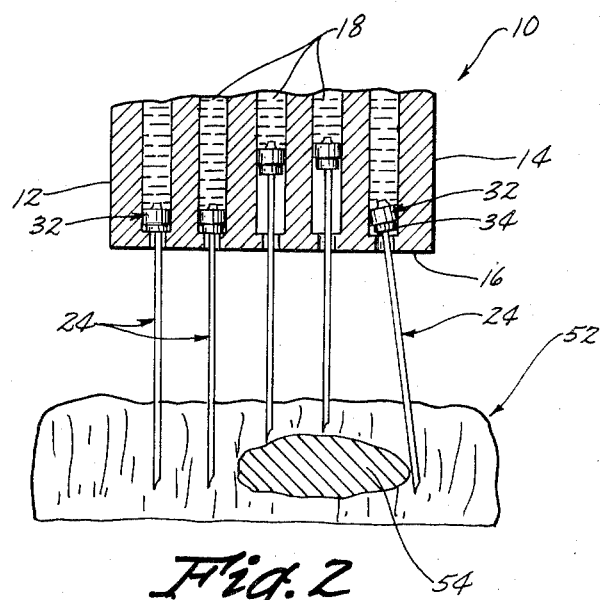
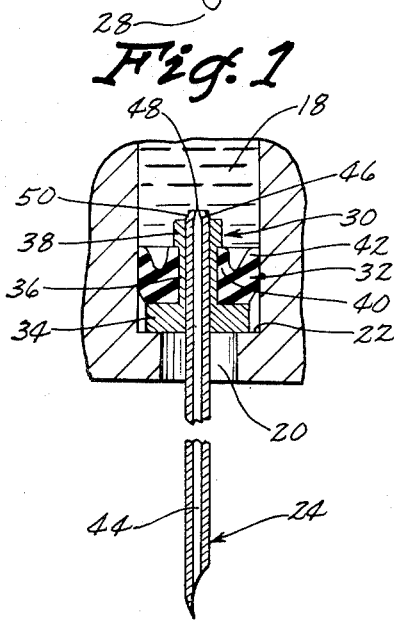
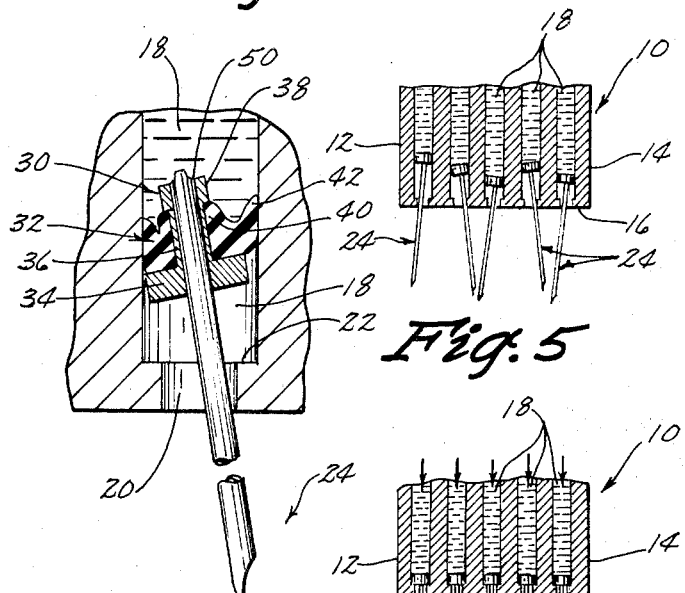
Fig. 1
Fig. 2
Fig. 3
Fig. 4
Fig. 5
Fig. 6
INVENTOR
DONALD L. BEASLEY
BY
Zarley, McKee & Thomte
ATTORNEYS

MEANS FOR INJECTING FLUID INTO MEAT PRODUCTS AND THE LIKE

This invention relates to an improvement of the invention disclosed in Ser. No. 10,908 filed Feb. 12, 1970, said earlier filed application together with the instant application having been assigned to the same assignee.

The earlier application discloses a machine for injecting fluids into meat products and the like. The machine of the said earlier application includes a fluid manifold having a plurality of injector needles slidably mounted therein which were adapted to pierce the meat product to inject fluid thereinto. The needles of the earlier application can slidably move inwardly into their respective bores upon engaging a bone in the meat product. However, the needles of the earlier application cannot deflect in a lateral direction upon encountering a bone in the meat product and the instant invention relates to an improved fluid manifold and injector needle arrangement.

Therefore, it is a principal object of this invention to provide a means for injecting fluid into meat products and the like.

A further object of this invention is to provide a means for injecting products and the like which includes a plurality of injector needles which are slidably mounted in a fluid manifold, the fluid injector needles also being adapted to be deflected in either a lateral or upward direction upon engaging a bone in the meat product.

A further object of this invention is to provide a means for injecting fluid into meat products and the like wherein means is provided for preventing the crystallization of salts on the inner end of the injector needles.

A further object of this invention is to provide a means for injecting fluids into meat products and the like having injector needles which include means for preventing the bores therein from becoming plugged.

A further object of this invention is to provide a means for injecting fluids into meat products and the like which is economical to manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a partial perspective view of the injector needles of this invention.

FIG. 2 is a sectional view illustrating the relationship of the injector needles, fluid manifold and meat product.

FIG. 3 is a sectional view illustrating an injector needle in its lowermost position within a bore formed in the fluid manifold.

FIG. 4 is a view similar to FIG. 3 but illustrating the injector needle in a deflected position.

FIG. 5 is a sectional view illustrating the relationship of the injector needles when the needles have been deflected and the fluid pressure is not imposed thereon, as in the return or upward stroke.

FIG. 6 is a sectional view similar to FIG. 5 illustrating the relationship of the injector needles when fluid pressure is imposed thereon as in the downward stroke.

The numeral 10 generally designates an injector manifold such as disclosed in Ser. No. 10,908 filed Feb. 12, 1970. Manifold 10 includes opposite sides 12 and 14 and bottom 16. Manifold 10 has a plurality of closely spaced vertical bores 18 formed therein as illustrated in FIG. 2. The bores 18 are in communication with fluid under pressure.

Each of the bores 18 have a reduced diameter portion 20 which extends through bottom 16. An annular shoulder 22 extends around reduced diameter portion 20 as seen in FIGS. 3 and 4. An injector needle 24 is slidably mounted in each of the bores 18 and comprises generally an upper end 26, lower end 28, seal support 30 and seal 32. Support 30 includes an outwardly extending shank portion 34, intermediate portion 36 and upper end portion 38. Upper end portion 38 is spaced below the upper end of the injector needle as illustrated in FIG. 3.

Seal 32 has a central portion 40 which embraces intermediate portion 36 of support 30. Seal 32 also includes an upwardly and outwardly extending skirt portion 42 which sealably engages the wall surface surrounding the bore 18. Seal 32 is sufficiently resilient so as to permit the deflection of the skirt portion as illustrated in FIG. 4.

The diameter of shank portion 34 is less than the diameter of bore 18 with the diameter of seal 32 being greater than the diameter of bore 18 so that the seal will prevent the escape of fluids therearound.

Needle 24 includes a bore 44 extending therethrough, the upper end of which tapers at 46 is illustrated in FIG. 3 to provide an orifice 48 which is considerably smaller than the diameter of the bore 44. As shown in FIG. 3, the area 50 around orifice 48 is very small to prevent the crystallization of salts around the orifice.

The normal method of operation is as follows. The meat product 52 would be passed beneath the fluid manifold by the machine with the fluid manifold being moved downwardly so that the needles 24 can pierce the product to inject fluid thereinto. The fluid injected into the meat product would ordinarily be a pickling brine, flavoring additive, etc. The pickling brines are injected into certain meat products such as pork bellies, bone-end hams, boneless hams, boneless pork butts, jowls, bacon squares, etc., to cure the same. Additionally, certain other fluids are injected into various meat products for such purposes as protein alteration, flavoring, etc.

When the manifold 10 has been lowered with respect to the meat product so that the needles pierce the product, the valve means associated with the manifold would cause fluid to be pumped from the bores 18 downwardly through the bore 44 and into the product. The small area 50 around the orifice 48 of the needles 14 is such that salt crystallization thereon is prevented which eliminates the possibility that the orifice may become plugged. Additionally, the tapered surface 46 is designed so as to provide an extremely small orifice 48 at the upper end of bore 44 so that if a foreign particle enters orifice 48, it will not become caught in the bore 44 since the bore tapers outwardly from the small orifice 48 to the larger bore portion immediately below the tapered portion 46. If the bore 44 had a constant diameter from its lower to upper end, the possibility would exist that particles entering the upper end of the bore 44 could become clogged or caught in the bore.

When the manifold has been moved downwardly or towards the meat product as illustrated in FIG. 2 so that the injector needles engage the product, the needles may slidably move upwardly in their bores 18 if they should engage a bone or the like which is designated by the reference numeral 54 in FIG. 2. The fact that the needles can slidably move upwardly in their respective bores 18 prevents damage to the needle. The needles will only move upwardly in the bores 18 upon engagement with a bone or the like since the fluid pressure thereabove maintains them in their normal extended position. Further, the fact that the diameter of portion 20 is considerably larger than the diameter of the needle permits the needle to deflect in a lateral direction upon the needle engaging a bone as illustrated in FIG. 2. The resilient features of the seal 32 insures that fluid will be prevented from leaking from the bore 18 even if the needles are deflected such as seen in FIG. 4. The fact that the needles can deflect in a lateral direction permits the needles to deflect around the bone so as to permit the maximum penetration of the needle with respect to the meat product. When the fluid manifold 10 is raised from the position of FIG. 2, the fluid pressure above the needles causes the needles to straighten or move to a vertical position automatically (FIG. 6). The fluid pressure normally maintains the needles in the position seen in FIG. 3 and FIG. 6 and it can be seen from FIG. 3 that the shank portion 34 rests upon the annular shoulder 22 to yieldably maintain the needle in the vertical position.

Thus it can be seen that the invention accomplishes at least all of its stated objectives.

I claim:

1. In combination,
a machine for injecting fluids into meat products,
a meat product support means on said machine,
a fluid manifold means on said machine adjacent said support means,
a first power means operatively connected to said fluid manifold means for reciprocating said manifold means towards and away from a meat product on said support means,
said fluid manifold means being connected to a source of fluid under pressure,
said manifold means having a plurality of spaced apart injector bores formed therein, each of said bores having a reduced diameter portion provided at one end thereof,
and an injector needle slidably mounted in each of said bores and having a portion extending through said reduced diameter portion adapted to pierce the meat product,
means on said needles to permit the deflection thereof with respect to the bore upon the needle engaging a bone in said meat product,
each of said needles including a fluid bore extending therethrough, said fluid bore having a fluid intake orifice at one end and a fluid discharge opening at its other end, said intake orifice having a diameter smaller than the diameter of said fluid bore.

2. In combination,
a machine for injecting fluids into meat products,
a meat product support means on said machine,
a fluid manifold means on said machine adjacent said support means,
a first power means operatively connected to said fluid manifold means for reciprocating said manifold means towards and away from a meat product on said support means,
said fluid manifold means being connected to a source of fluid under pressure,
said manifold means having a plurality of spaced apart injector bores formed therein, each of said bores having a reduced diameter portion provided at one end thereof,
and an injector needle slidably mounted in each of said bores and having a portion extending through said reduced diameter portion adapted to pierce the meat product,
means on said needles to permit the lateral deflection thereof with respect to the bore upon the needle engaging a bone in said meat product,
each of said needles comprising inner and outer ends, a seal support on said needle at the inner end thereof, a seal means on said seal support sealably engaging the wall surface around said bore,
each of said seal supports comprising an inner end portion positioned outwardly of the inner end of said needle, an intermediate portion extending from said inner end portion, and a shank portion extending transversely from said intermediate portion, said seal means embracing said intermediate portion between said inner end portion and said shank portion,
said seal support having a diameter less than the diameter of said bore and greater than the diameter of said reduced diameter portion, said needle including a stem portion which extends through said reduced diameter portion, the diameter of said stem portion being substantially smaller than the diameter of said reduced diameter portion to permit the lateral movement of said stem portion with respect to said reduced diameter portion.

3. The combination of claim 1 wherein each of said needles includes a tapered bore portion extending from said intake orifice to said fluid bore, said tapered bore portion increasingly tapering outwardly from the diameter of said intake orifice to the diameter of said fluid bore.

4. The combination of claim 3 wherein said fluid intake orifice has a diameter substantially that of said inner end of said needle to prevent salt crystallization on said inner end of said needle around said intake orifice.

* * * * *